Nov. 16, 1965 J. FRANCEL ETAL 3,218,140
METHOD FOR CLEANING GLASS-WORKING TOOLS
Original Filed Oct. 24, 1960 3 Sheets-Sheet 1
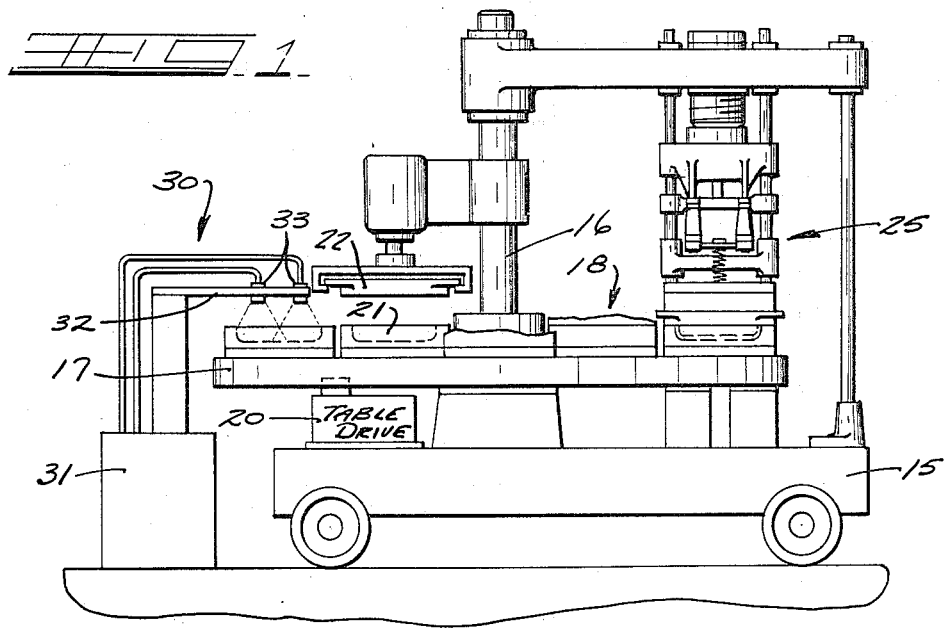
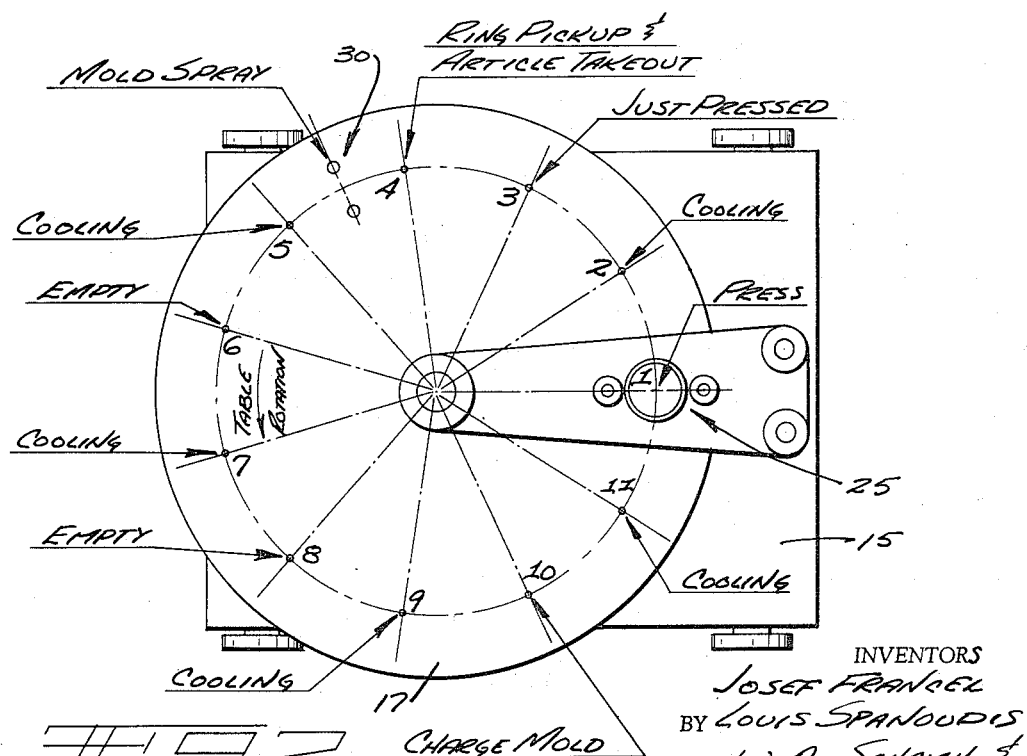
INVENTORS
JOSEF FRANCEL
BY LOUIS SPANOUDIS
W. A. SCHAICH &
E. J. HOLLER
ATTORNEYS INVENTORS
JOSEF FRANCEL
BY LOUIS SPANOUDIS
W. A. SCHAICH &
E. J. HOLLER
ATTORNEYS

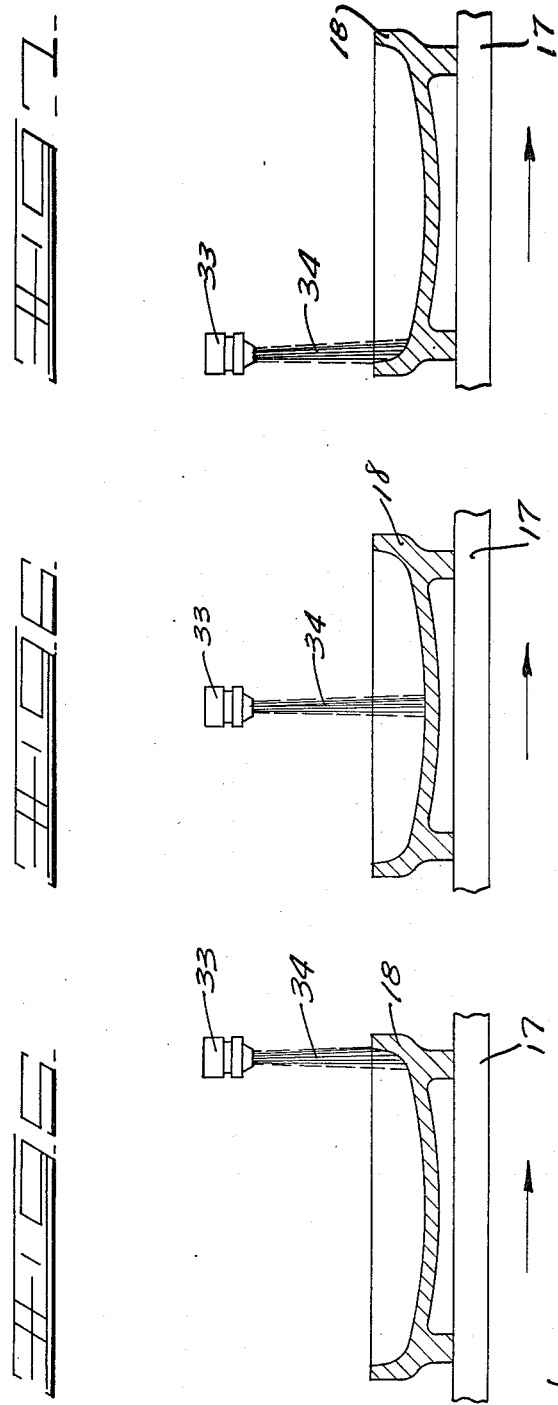
INVENTORS
JOSEF FRANCEL
LOUIS SPANOUDIS
BY W. A. SCHAICH &
E. J. HOLLER
ATTORNEYS United States Patent Office 3,218,140
Patented Nov. 16, 1965

3,218,140
METHOD FOR CLEANING GLASS-WORKING TOOLS
Josef Francel and Louis Spanoudis, Toledo, Ohio, assignors, by mesne assignments, to Owens-Illinois Glass Company, a corporation of Ohio
Continuation of application Ser. No. 64,560, Oct. 24, 1960. This application July 30, 1964, Ser. No. 387,549
6 Claims. (Cl. 65—27)

This application is a continuation of application Serial Number 64,560, filed October 24, 1960, now abandoned.

The present invention relates to a novel method and composition for cleaning the glass-contacting surfaces of a glass-working tool, and, more specifically, to maintaining in essentially deposit-free condition pressing, blowing, rolling or other glass-forming elements of various types of forming machines while such machines are in operation.

Glass articles such as face plates and implosion panels for television picture tube envelopes and glass block sections are customarily formed by placing a charge of hot molten glass in a press mold having an internal molding surface corresponding to the external configuration of the article to be formed and moving a press plunger downwardly into contact with the molten glass to displace the same throughout the molding cavity and form the glass article. The plunger has external molding surfaces corresponding to the internal configuration of the article which is to be formed. It is extremely important in such press molding operation that the glass-forming surfaces of both the press mold and press plunger be maintained thermally within known working limits for the particular glass being formed as well as free from residue and deposits which tend to accumulate during repeated forming operations.

A condensation or residue of glass fumes and other objectionable material emanates from hot plastic glass on forming and deposits on the metallic forming surfaces of plungers, pressing and blowing molds, shaping rolls and the like which constitute operative members of automatic glassware forming machines. During repeated usage of these members condensation products and residual deposits resulting from working contact with the molten glass accumulates on the glass contacting surfaces. These residues and deposits tend to accumulate on localized regions of the working tool and produce corresponding defects such as haze patterns, visible dark specks, and so-called "impact marks" which are impressed in the ware being produced.

The objectionable deposits also cause the newly-formed glass article to stick thereto causing imperfections such as checks, laps and crizzles in the article surface on separation of the forming members, or on subsequent removal of the article from the mold. The deposits are not particularly objectionable in forming some types of ware. However, the resultant defects which are produced thereby are a major source of rejection in the manufacture of high quality glassware where surface properties are of considerable importance such as in the manufacture of pressed face plates or implosion panels of television picture tube envelopes and half-sections of light-transmitting and controlling glass blocks having internal prismatic surfaces. Obviously, such deposits cannot be tolerated in forming ware of optical quality.

Undesirable deposits and residue which result from repeated working contact with hot plastic glass have previously been avoided by relatively frequent replacement of forming molds on a pressing machine, for example, and subjecting the removed molds to immersion in chemical solutions, or alternatively, grinding and polishing the molding surfaces. Extensive grinding and polishing is costly and results in decreased mold life due to changes in dimensions.

The loss of production which occurs while hollow molds having substantial mass and dimensions are removed and replaced is not only a serious problem due to down-time of the machine per se, but is substantially extended due to an extensive period necessary for the substituted molds to reach a heat-balanced condition to resume satisfactory repetitive molding operations.

Condensation products and residue which emanate from the hot plastic glass tend to build up on the forming surfaces and have been analyzed by X-ray analysis as comprised primarily of the more volatile constituents of the glass such as compounds of alkali metals, halogens such as fluorine and chlorine, boron, sulphur, arsenic, lead and other elements in lesser amount. In forming glasses such as those commonly employed in making electron-discharge tube envelopes the deposits consist predominantly of alkali fluorides. In deposits resulting from forming borosilicate glasses alkali borates predominate and in forming soda-lime glasses, alkali oxides and alkali sulphates are common.

In analyzing the deposits originating from press forming conventional television picture tube glasses, it was found that these deposits are associated with the fluorine evolution from such fluorine-containing glasses. The approach to chemical removal of the deposits in accordance with our invention is to form unstable fluoride compounds from the stable fluoride compounds present in the deposits. The unstable fluoride compounds are volatile at the mold operating temperatures and thus can be quickly released from the molds.

The literature of fluorine chemistry indicates several promising reactions which are utilizable in the present invention to form unstable fluoride compounds from stable fluoride compounds. Alkali fluorides react with formic acid to form highly-volatile formyl fluoride according to the reaction below where R denotes any alkali.

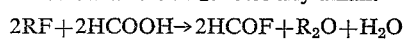

The formyl fluoride (HCOF) has a boiling point of $-26°$ C. and can exist only as a vapor at the mold operating temperatures of 350° to 400° C., for example. In the reaction of alkali fluorides with nitric acid fluorine is given off as a gas according to the reaction:

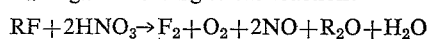

The boiling point temperatures of the gaseous reaction products are fluorine ($F_2$) $-188°$ C., oxygen ($O_2$) $-183°$ C., and nitric oxide (NO) $-162°$ C. Due to their very low boiling point temperatures, these products are extremely volatile at mold operating temperatures. In the reaction between alkali fluorides and oxalic acid, it is known that oxalic acid can be utilized for separation of the fluoride ion.

As stated, the prior art has resorted to the removal of objectionable residue by removing the forming element and soaking same in a chemical bath, abrading the fouled surfaces or directing impinging solid particles at the deposits to obtain an abrasive action over a substantial period of time. The impingement of solid particles tends to cool the forming tools excessively during the required cleaning time causing disruption of their normal use and can result in leaving an undesirable residual film such as insoluble carbonates.

In cleaning procedures where an impinging-type blast or spray is directed against the forming surfaces, materials which result in the formation of acidic fumes can be undesirable due to their tendency to corrode metallic tools and structural elements of the machine and must be avoided. Cleaning of glass-working tools without interruption during their continued operation over an extensive campaign has heretofore been a continuing problem in the art. The present invention is concerned with the elimination of such difficulties.

Accordingly, it is an object of the present invention to provide a novel method and composition for cleaning a glass-working tool during its continued use while at an elevated working temperature.

Another object of the present invention is to provide a novel composition for the elimination of objectionable residue from a glass-working tool while at working temperature without interruption of its normal operation to considerably lengthen its working life.

Another object of the present invention is to provide a composition readily applicable to the glass-contacting surfaces of metallic glass-forming members to decompose essentially completely condensation and residual deposits emanating from glass fumes on said members into readily-dispersed unobjectionable gaseous reaction products.

Another object of the present invention is to provide a method of eliminating undesirable glass-fume condensation products and residual deposits from the surfaces of a glass-working tool while at elevated working temperatures without adversely affecting its normal use for the surrounding environment.

A further object of the present invention is to provide a method of preventing the accumulation of glass-fume condensation and residue on forming surfaces of various types of glass-forming elements during their conventional operation by directing an impinging spray of an aqueous solution of an ammonium salt of an acid selected from the group consisting of ammonium formate, ammonium oxylate and ammonium nitrate over the forming surfaces.

A still further object of the present invention is to provide a composition for cleaning and eliminating undesirable residue resulting from working contact with molten glass which tends to foul the surfaces of a glass-contacting member during its use at an elevated working temperature, the composition consisting of an essentially neutralized aqueous solution of an ammonia derivative and an acidic constituent adapted to form gaseous reaction products with the residue.

The specific nature of this invention as well as other objects and advantages thereof will become apparent to those skilled in the art from the following detailed description taken in conjunction with the annexed sheet of drawings on which, by way of preferred example only, are illustrated the preferred embodiments of this invention.

Referring to the accompanying drawings:

FIGURE 1 is an elevational view of a press molding machine in which the present invention is embodied.

FIGURE 2 is a diagrammatic plan view of the machine shown in FIGURE 1.

FIGURES 5, 6 and 7 illustrate a single mold in vertical section in a side view showing the treatment thereof during its movement in a horizontal plane on the machine.

Figure 3:
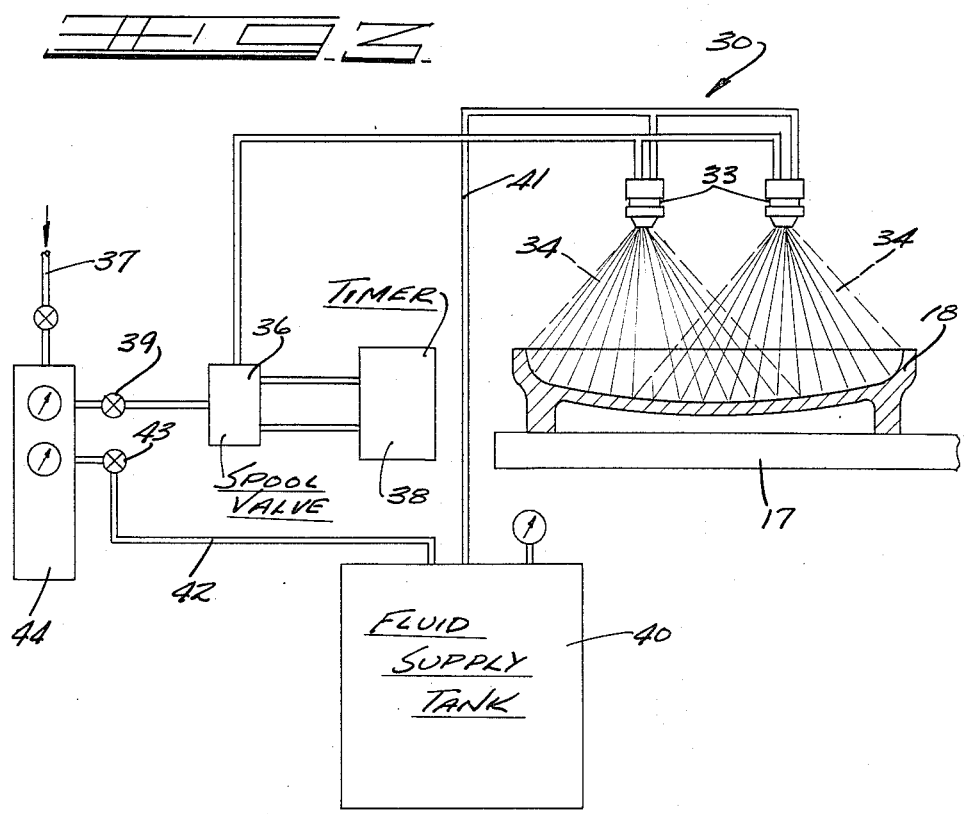
FIGURE 3 is a schematic view of mold treating apparatus and a single mold taken in enlarged vertical section along the line 3—3 of FIGURE 4 in accordance with the invention.

While this invention will be described hereinafter as specifically applied to treating hollow molds adapted to form face plate members of cathode-ray picture tube envelopes, it will be readily apparent to those skilled in the art that the principles of the invention are equally applicable to many other types of glass-forming apparatuses and processes including pressing, blowing, rolling, bending, and reshaping operations and combinations thereof.

We have now discovered that glass-working difficulties such as those outlined above can be overcome and undesirable glass-fume deposits expeditiously removed from a glass-working tool at elevated working temperature with no interference with its conventional function or disruption of production conditions by directing a finely-atomized spray or mist of an aqueous solution containing an ammonia derivative and an acidic constituent such as formic acid, oxalic acid or nitric acid into impinging contact with the residue without substantial wetting of the same to effect virtually complete dissociation of the residue into gaseous reaction products. The aqueous solution is atomized into finely-divided particles and directed to impinge over essentially all glass-contacting surfaces of a prescribed forming tool, and further may be applied selectively in greater concentration to surface areas having greater propensities to the formation of residue.

The aqueous solution is maintained in essentially neutralized condition having a pH in the range of 6.5 to 7 and is particularly effective for reaction with alkali metal compounds such as alkali fluorides and alkali chlorides emanating from electronic glass compositions in a preferred form of the invention. The prescribed compositions comprises an aqueous solution of an ammonia derivative and an acid such as formic, oxalic or nitric acid which comprises at least 5% by weight of the solution. The treating composition consists of an aqueous solution of formic acid, oxalic acid, or nitric acid in an amount ranging from 5% by weight to saturation for formic and oxalic acids and about 50% by weight for nitric acid. In a preferred form of the invention, the aqueous solution consists of ammonium formate consisting of about 21.3% formic acid, 7.9% ammonia and 70.8% water by weight, this solution having a pH in the range of 6.5 to 7.0. It has been found that an ammonium formate solution having a concentration of about 12% to 52% ammonium formate by weight and the balance being water is particularly effective in deposit elimination. The aqueous solution comprises an ammonium salt of an acid dissolved in water, the ammonium salt consisting of ammonium formate, ammonium oxylate and ammonium nitrate and comprising about 12% to 52% by weight of the aqueous solution.

Ammonium formate solution having a concentration of 21.3% formic acid, 7.9% ammonia and 70.8% water by weight is of particular utility for obtaining effective deposit removal. While more concentrated solutions can be employed, this results in an inefficient use of the material; while where the solutions are too dilute, less efficient deposit removal can be effected. It is preferred in compounding the ammonium formate solution that distilled water be employed to minimize the inclusion of calcium, magnesium and sodium ions which can leave a deleterious whitish deposit on the molds. Ammonium formate solution is highly ionized and readily applicable to reacting with deposits at elevated temperatures. Due to its ionization constant, the equipment necessary to achieve spraying of the solutions is selected with regard to its corrosion resistance and stainless steel such as No. 303 is fully adequate. Also chromium-plated metallic components or other types of stainless steel may similarly be employed. The ammonium formate solution is economical, readily available and sufficiently stable at ambient temperature for preparation and handling of the treating material. It does not produce toxic or objectionable fumes which would require venting procedures.

Referring now to the drawings, spraying apparatus for practicing the method and utilizing the composition of the invention is shown and described in combination with one type of press-forming machine for illustrative purposes. Referring to FIGURE 1, a glass forming machine is mounted on a base 15 from which rises a stationary column 16. A mold table 17 has mounted thereon a plurality of mold units 18 arranged in an annular series around the column 16. The mold table is rotated intermittently, step by step, by means of a table drive mechanism 20 which is of the usual construction well known in the prior art. Each mold unit 18 is brought by rotation of the mold table to stations numbered 1–11 as shown diagrammatically in FIGURE 2. These include a mold charging station 10 at which a charge or gob of molten glass is placed in each mold, a press molding station 1 where the article is press molded, a take-out station 4 at which the article is removed from the mold, intermediate cooling stations at which the article is cooled into final form and stations at which the mold is empty.

Each stepwise rotation of mold table 17 is through an angular distance twice the distance between adjoining stations so that the article molded at station 1 travels through more than one complete revolution of the mold table before it arrives at take-out station 4. Following the press molding station 1 each article is held stationary within its respective mold at the cooling stations 3, 5, 7, 9, 11 and 2 in succession during further rotation of the mold table before arrival at the take-out station 4. After removal of the molded article at take-out station 4, the mold remains empty while at stations 6 and 8 prior to being recharged at station 10.

Molds 18 which are illustrative of simply one conventional type of glass-forming element are applicable to molding hollow glass face plates for television picture tubes. Each mold 18 comprises a body mold 21 and a ring mold 22, the latter adapted to shaping the upper rim portion of the hollow face plate. When a charge of molten glass has been delivered into the mold at the charging station 10, the next rotational step of mold table 17 brings the mold directly beneath the press plunger or ram 25 at station 1. Plunger 25 is moved reciprocatably down and up by a fluid-operated motor as known in the art.

When mold 18 containing the molded article is brought to take-out station 4, the mold ring is lifted upwardly away from the mold and the molded article is removed from the mold body portion. Immediately upon removal of the completed article and the return of the mold ring portion to the mold body portion, the table rotates counter-clockwise as shown in FIGURE 2 moving the just-emptied mold from station 4 to station 6. At this time the upwardly-facing mold unit 18 passes beneath the mold spraying equipment 30 which is mounted in stationary relation extending over the mold table 17. Further structural details of the illustrated press-mold machine are shown in copending application Serial No. 18,148, filed in the name of R. L. Vogelpohl on March 28, 1960, now U.S. Patent No. 3,119,681, granted Jan. 28, 1964, entitled "Glass Forming Molds," which application is assigned to a common assignee.

Mold spray apparatus 30 is mounted in stationary relation on a base 31 with a cantilevered arm 32 extending over the mold path between adjacent stations 4 and 5. Arm 32 carries a pair of similar spray nozzles 33 in spaced-apart alignment disposed on a radial line extending from the machine column 16 as shown in FIGURES 1 and 2.

Figure 4:
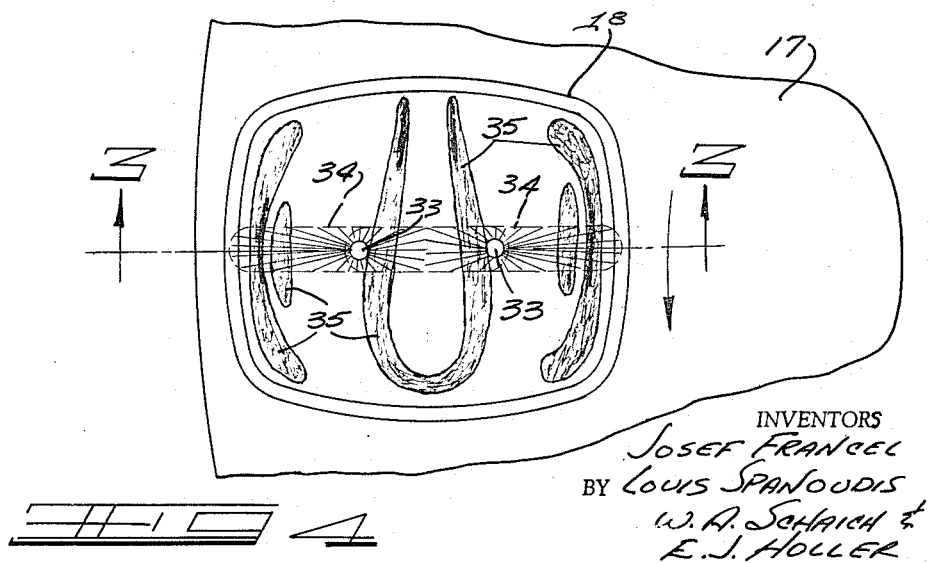
FIGURE 4 is a plan view of a single mold on scale similar to FIGURE 3 illustrating one representative embodiment of deposit formation and mold treating patterns.

As shown in FIGURE 4, objectionable deposits tend to accumulate within rectangular hollow mold 18 in a pattern generally similar to the shaded areas indicated by the numeral 35. Normal deposition of the molten glass charge essentially in the mold center with its shear mark cast to one side tends to form a U-shaped pattern of deposits in the mold central region. Also deposits tend to occur in the corner regions essentially on the long axis of the mold. The indicated areas of the illustrated type of mold show propensities toward deposit build-up in these prescribed regions, although, obviously, the deposit patterns will vary widely in other forms of glass-shaping apparatus. The accumulation of glass-fume deposit and residue on the glass-contacting surfaces thereof has previously necessitated frequent substitution of the molds as outlined hereinabove in producing high-quality defect-free ware.

Spray apparatus 30 as illustrated schematically in FIGURE 3 consists of a pair of similar spray nozzles 33 mounted in proximity immediately above and facing downwardly normal to the arcuate line of horizontal travel of the series of molds 18 on the mold table. Each nozzle 33 is supplied continuously with the subject aqueous composition which is contained under low pressure in a fluid supply tank 40.

A direct application of a finely-atomized aqueous spray is necessary for effective deposit build-up removal from the molds. With the deposits being present in a solid phase, the reaction between finely-divided liquid particles, i.e. liquid phase, and the solid phase, i.e. deposits, is more expeditious and complete than the reaction with the spray material being in the form of solid particles or gaseous decomposed products.

Referring again to the spray apparatus, each of the nozzles 33 is adapted to emitting a spray pattern which consists of a flattened cone-shaped pattern of a fine mist. In other words, the spray has a wide sweeping extent across a considerable region of the mold face in one direction (long axis) and rather narrow lateral extent in the other direction (short axis). Each spray gun 33 is supplied with high pressure air which passes through a spool valve 36 in timed and controlled relation from an air supply source 37. The high pressure air supplied to spool valve 36 is controlled as to its pressure level by a regulatory valve 39 and its on-off relation by a timer 38. The subject aqueous solution is contained within fluid supply tank 40 having a line 41 interconnecting with each spray nozzle 33. Tank 40 is pressurized by low pressure air introduced thereinto by line 42, the pressure being controlled by regulatory valve 43. Both the high pressure air utilized to operate the spray guns and the low pressure air utilized to conduct the aqueous solution to the spray guns passes directly from the supply source 37 through an air pressure controlling transformer 44.

Spray nozzles 33 are mounted with their axes normal to the horizontal open end of the mold. Each nozzle produces a fan-shaped pattern which patterns overlap in a central region of the mold to selectively cover the center region with an increased application of mold treating solution.

During indexing movement of mold unit 18 in a horizontal plane between stations 4 and 6 timer 38 is actuated by the machine central timing mechanism immediately precedent to passage of the leading edge of the mold beneath spray nozzles 33. As shown sequentially in FIGURES 5, 6, and 7, spray patterns 34 are initiated and delivered when mold 18 moves directly beneath the nozzles while indexing from stations 4–6. FIGURE 5 shows the initiation of the spray patterns on the leading edge of the mold cavity. FIGURE 6 shows the mold position at a half-way point of the spraying cycle during further horizontal movement of the mold. FIGURE 7 shows the position of the mold during the latter stage of the spray cycle when the spray cycle is completed and the nozzles are turned off by actuation of timer 38. It is to be noted as shown in FIGURES 3 and 4 that the pair of spray patterns 34 overlap in the central region of the mold where the mold glass charge is initially deposited within the mold and objectionable residue tends to occur.

The aqueous solution may be applied to the forming molds 18 while at normal operating temperatures such as from 350° to 400° C. Further, the material is useful for deposit removal at lower temperatures although the elevated working temperatures achieve more effective treatment without interference with molding operations.

The method may be summarized as follows:

An aqueous solution of an ammonium salt of an acid such as formic, oxalic or nitric acid is prepared. The concentration of the ammonium salt ranges from about 12% to 52% by weight with the balance being water. The solution is prepared having a pH in the range of from 6.5 to 7.0. Small amounts of ammonium hydroxide or additional acid can be employed as necessary to control pH. Normally in the case of preparing ammonium formate solution having the indicated concentration of from about 12% to 52% ammonium formate by weight the pH will require no or only slight modification.

The aqueous solution is pressurized with a gaseous fluid such as air to form a fine particle mist having a particle size ranging from about 1–10 microns. It is preferred that atomization of a low particle size be effected to obtain more rapid reaction with the deposit accumulation. Approximately 2 cubic centimeters of the aqueous solution are sprayed from the pair of nozzles to impinge upon the mold forming surfaces each treating cycle. About 4 to 5 gallons of solution is used per 24 hour period on the 11-station press depending upon its operating rate. The rapid reaction between the liquid-phase small particles of ammonium formate and the solid-phase deposit causes sudden evolution of gaseous reaction products at the surface of the condensation and residue to achieve a decomposition thereof on contact therewith. Care is employed to prevent the finely atomized spray from actually wetting the mold forming surfaces at an elevated temperature to such an extent as to cool these surfaces by withdrawing heat for vaporization thereof. This is controlled by observation that no appreciable darkening of the surfaces occurs on spray impingement.

Reactions which occur where an aqueous solution of ammonium formate is employed to contact and impinge substantially completely and selectively on areas highly conductive to deposit accumulation result in essentially complete dissociation and removal of the deposits. Non-wetting application subject solutions of the metallic forming surfaces prevents any corrosive effects thereupon and seemingly leaves an extremely thin film of deposit which serves as a protective coating or interlayer during repeated application of the cleaning medium to the mold surfaces. The spray application is preferably conducted once each complete forming cycle of the machine. In other words, during operation of mold table 17 which carries eleven molds moving through two stations each indexing step of the table, spray nozzles 33 are operated by timing mechanism 38 only during the interval when an empty mold is conveyed therebeneath while being indexed from stations 4–6. This is immediately precedent to the introduction of a molten glass charge into the just-treated mold at station 10. In the arrangement of the spray mechanism shown in FIGURES 1 and 2, alternate indexing steps of the machine carry a loaded mold and an empty mold below the spray mechanism 30. The spray nozzles are operated to direct the impinging spray aqueous particles only during the movement of an empty mold therebelow. Spraying is not conducted during the interval when a loaded mold is moved between stations 3 and 5.

It has also been observed that the subject aqueous solution of an ammonium salt of an acid such as ammonium formate can be beneficially applied directly to forming surfaces of the plunger such as by swabbing or brushing. Such treatment need not be conducted as frequently as the mist-type spraying of the mold surfaces. For example, it has been found that swabbing of the plunger side surfaces about once every 10 to 30 cycles is effective to prevent deposit build-up thereon, while spraying of the mold is performed each cycle preferably.

The subject method and composition have been shown to be especially effective in eliminating all residues emanating from glass fumes from the more common television glass compositions as well as on during forming of other glasses such as borosilicate and soda lime compositions. A typical television tube envelope glass composition consists of approximately 67.3% $SiO_2$, 4.0% $Al_2O_3$, 0.2% CaO+MgO, 10.9% BaO, 1.4% PbO, 7.9% $Na_2O$, 6.7% $K_2O+Rb_2O+Cs_2O$, 0.25% $Li_2O$, 0.8% $F_2$, 0.70% $Sb_2O_3$, and 0.15% $As_2O_3$. The subject invention is of particular utility in minimizing and eliminating deposits formed by repeated press forming of this glass.

It has been observed that the frequency of cleaning forming molds employed in shaping fluorine-containing glasses has on occasion required a change of all eleven molds per machine per eight-hour shift or 33 molds per day. With the subject method and composition employed to clean the forming molds between each forming operation therewith, it is now possible to obtain ware of equal or better quality with only eleven mold changes per day. This is a substantial increase in efficiency of mold changing frequency and results in both improved quality ware as well as longer, useful mold life.

Various modifications may be resorted to within the spirit and scope of the appended claims.

We claim:
1. In the manufacture of glass articles from hot molten charges of glass wherein the charges are successively brought into contact with the forming surface of a glass-working tool, the method of eliminating objectionable solid condensation products and solid residual deposits from the forming surfaces of the glass-working tool during the continuous operation of the glass-forming tool which comprises the steps of
    forming a spray consisting of finely atomized liquid particles of an aqueous solution containing at least 5 percent by weight of an acidic constituent selected from the group consisting of formic acid, oxalic acid and nitric acid,
    periodically directing said spray against such condensation products and residual deposits on the hot forming surface of the glass-forming tool during the continuous operation of said glass-forming tool, and
    adjusting and maintaining the amount and size of the liquid particles being sprayed to impinge the particles of the aqueous solution in a liquid state upon the forming surface of the glass-working tool and wet the forming surface so that a liquid phase-solid phase reaction occurs wherein the liquid phase acid constituent reacts with the solid condensation products and solid residual deposits to form gaseous reaction products that are gaseous at room temperature,
    discontinuing the directing of the liquid particles on the forming surface after the surface is wetted sufficiently to cause said reaction to occur and insfficiently to prevent significant cooling of the glass-working tool whereby the gaseous reaction products are dissipated before the forming surface again contacts the glass.
2. The method set forth in claim 1 wherein said solution includes an ammonium derivative whereby when the liquid phase particles impinge on the surfaces of the glass-forming tool, the ammonium constituent immediately vaporizes as ammonia without leaving a residue.
3. The method set forth in claim 1 wherein said solution has a pH of 6.5 to 7.0.
4. The method set forth in claim 1 wherein said spray is formed by atomizing said aqueous solution with air to form a fine mist having a particle size ranging from about 1 to 10 microns.
5. The method set forth in claim 1 including the step of directing said spray of finely atomized liquid particles selectively in greater concentration on the surfaces of the glass-working tool which have greater propensity to the formation of such condensation products and residual deposits.
6. In the manufacture of glass articles from hot molten charges of glass wherein the charges are successively brought into contact with the forming surface of a glass-working tool, the method of eliminating objectionable solid condensation products and solid residual deposits from the forming surfaces of the glass-working tool during the continuous operation of the glass-forming tool which comprises the steps of
    forming a spray consisting of finely atomized liquid particles of an aqueous solution containing at least 5 percent by weight of an acidic constituent consisting of formic acid,
    periodically directing said spray against such condensation products and residual deposits on hot forming surface of the glass-forming tool during the continuous operation of said glass-forming tool, and
    adjusting and maintaining the amount and size of the liquid particles being sprayed to impinge the particles of the aqueous solution in a liquid state upon the forming surface of the glass-working tool and wet the forming surface so that a liquid phase-solid phase reaction occurs wherein the liquid phase acid constituent reacts with the solid condensation products and solid residual deposits to form gaseous reaction products that are gaseous at room temperature,
discontinuing the directing of the liquid particles on the forming surface after the surface is wetted sufficiently to cause said reaction to occur and insufficiently to prevent significant cooling of the glass-working tool whereby the gaseous products are dissipated before the forming surface again contacts the glass.

References Cited by the Examiner

UNITED STATES PATENTS

| | | | |
|---|---|---|---|
| 2,047,507 | 7/1936 | Howard | 65—173 X |
| 2,071,220 | 2/1937 | Smith | 134—7 |
| 2,666,000 | 1/1954 | De Hoff | 134—3 |

DONALL H. SYLVESTER, *Primary Examiner.*